United States Patent Office 3,558,524
Patented Jan. 26, 1971

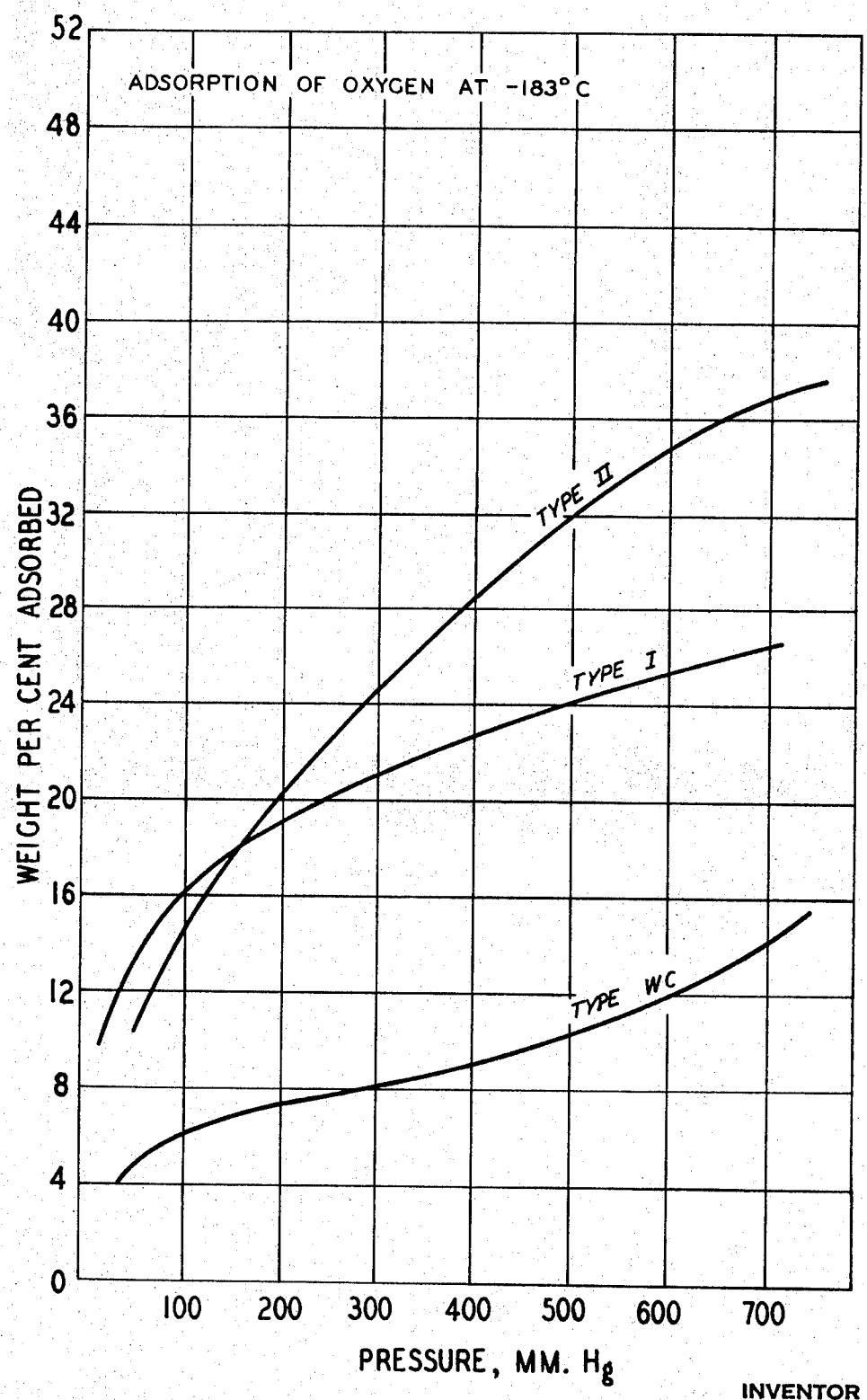

3,558,524
SILICA ADSORBENTS FROM ACID
TREATED WOLLASTONITE
Edith M. Flanigen, Buffalo, N.Y., assignor to Union Carbide Corporation, a corporation of New York
Continuation-in-part of application Ser. No. 636,158, May 4, 1967, which is a division of application Ser. No. 460,406, June 1, 1965. This application Aug. 7, 1968, Ser. No. 750,885
Int. Cl. B01j *11/62*
U.S. Cl. 252—450                    2 Claims

ABSTRACT OF THE DISCLOSURE

Amorphous silica-$CaCl_2$ composition adsorbents are derived from wollastonite by leaching with an aqueous hydrochloric acid solution of from 2.5 to 3.0 normality at from 15° C. to 60° C. The adsorbent product is characterized by being readily regenerated.

---

This is a continuation-in-part application of application Ser. No. 636,158, filed May 4, 1967 and now abandoned, which is in turn a division of copending application Ser. No. 460,406 filed June 1, 1965 and now abandoned in the name of Edith M. Flanigen.

The present invention relates in general to novel amorphous siliceous adsorbent materials and to the process for their preparation. More particularly the invention relates to hydrous silica-calcium chloride adsorbent compositions prepared by leaching with an acid a wollastonite mineral. The new amorphous adsorbent compositions exhibit the morphology of the parent crystalline material but differ substantially in adsorption characteristics.

Many solids that have a capacity for adsorbing gases or liquids are well known in the art. Many of these solids are naturally occurring minerals, and others are prepared from natural materials by relatively simple procedures such as calcination. Of rather recent development is the commercially significant class of synthetic crystalline aluminosilicate compositions commonly termed zeolitic molecular sieves.

Despite the vast number and variety of known adsorbent materials, few are adequately versatile or available in sufficient quantity at reasonable cost for wide commercial usage. The major classes in present use are aluminum oxide, activated carbon, silica gel and crystalline zeolites.

In view of the abundance of wollastonite, which is not an adsorbent in the generally accepted meaning of the term, it would be highly desirable to be able to modify this inexpensive raw material to obtain a useful commercial desiccant.

It is therefore the general object of the present invention to provide an inexpensive process for treating woolastonite to form new amorphous absorbent materials.

It is a more particular object to provide a process for treating natural wollastonite with hydrochloric acid to provide a novel adsorbent composition containing calcium chloride.

These and other objects which will be obvious from the specification appearing hereinafter are accomplished in accordance with the process of this invention which comprises contacting at a temperature of from about 15° C. to about 60° C. a wollastonite mineral with an aqueous solution of hydrochloric acid having a concentration of from about 2.5 to 3.0 normal, said acid being present in an amount such that there are at least 0.9 equivalents of acid-derived hydrogen ion per equivalent of metal (calcium) in the wollastonite (calcium metasilicate), and said acid and said wollastonite being maintained in contact for a period of from about 0.1 to 24 hours, the time and temperature of contact being commensurate such that substantially all of the calcium of the wollastonite has reacted with the acid to form a solid silica form pseudomorphic after the starting wollastonite having associated therewith calcium chloride. The resulting composite is isolated from the reaction system, dried, and activated by heating.

It is not known exactly how the calcium chloride is associated with the silica pseudomorph, but it is readily apparent that it is a composite form and not merely an admixture of silica and calcium chloride. It is well known that calcium chloride upon the adsorption of substantial quantities of water becomes a sticky mass which is extremely difficult to regenerate to the anhydrous state. A calcium chloride-containing pseudomorph of this invention, however, can be readily regenerated after adsorbing comparable quantities of water by heating under vacuum at a temperature of about 200° C.

It was further surprisingly found that Wollastonite does not form calcium chloride-containing pseudomorphs of the nature of those described above when hydrochloric acid solutions of strengths as high as 4 N or less than about 2.5 N or when temperatures of greater than about 60° C. are used regardless of the strength of the acid. Whereas under these different conditions a silica adsorbent which is pseudomorphic after the parent calcium silicate is produced having adsorptive properties, very little or not calcium chloride is occluded or otherwise contained in the product after isolation from the reaction mass.

Depending upon the reaction conditions such as temperature, time and acid strength which are employed in the hydrochloric acid extractions of wollastonite, distinct types of pseudomorphs based on adsorption characteristics of the respective activated product adsorbents can be prepared. Isotherms of the so-called Type I are of the Langmuir type for permanent gases and for water, i.e., for $O_2$ up to saturation ($P/P_0=1$) and for water up to $P/P_0=0.8$ incremental weight loading increases with increasing pressure. These characteristics are in general imparted to the silica pseudomorph produced by intensive leaching with HCl solutions of high concentrations at elevated temperatures.

The isotherms for the so-called Type II, which are of the Brunauer type, show almost linear increases in loading with increasing pressure for permanent gases and water. Pseudomorphs of this type are in general produced by leaching with hydrochloric acid of lower concentrations using elevated temperatures and quite long reaction periods.

As distinguished from these two types of pseudomorphs, the silica-calcium chloride composite pseudomorphs of this invention, hereinafter called type WC, containing at least about 10 weight percent $CaCl_2$ show unusually low capacities for permanent gases such as oxygen but show the highest water adsorptive capacities of all three types over a complete range of pressure.

Oxygen adsorption isotherms for all three types of pseudomorphs are set forth in the figure of the drawing.

The figure shows oxygen adsorption isotherm plots for typical Types I, II and WC pseudomorphs. The particular pseudomorphs involved were derived from wollastonite in accordance with the procedure of Example 1. Since the pseudomorphs characterized by these plots can be prepared from the same starting materials by varying certain reaction conditions, it is apparent that Type I and Type II represent only different species of an infinite series of different products, each differing in slight degree with respect to adsorption properties.

The isotherm plot Type WC, however, is of the unique $CaCl_2$— silica pseudomorph composite derived from calcium metasilicate and prepared by using hydrochloric acid of the narrow concentration range of 2.5 N to 3 N, reaction temperatures within the range of 15° C. to 60° C., and containing about 22.9 weight percent $CaCl_2$ on an anhydrous basis.

The adsorption characteristics for Type WC composite containing from about 10 to about 40 weight percent $CaCl_2$ (anhydrous basis) do not change appreciably over this range for oxygen, and thus serve to distinguish this adsorbent from other silica adsorbents heretofore known.

In carrying out the present process the manipulative steps are not critical. For example the order of mixing of reactants, pressure conditions, type of reaction vessel, and the utilization or non-utilization of stirring or agitation are not factors which significantly affect the overall process. After the acid-leaching operation has been completed, the product pseudomorph is readily isolated by filtration and drying in air. Activation of the pseudomorph, i.e., bringing the product to the state where it will readily accept adsorbate material, is accomplished merely by heating, at temperatures within the range of about 25° C. to about 350° C. preferably from about 150° to 175° C., either at normal pressures or under reduced pressure conditions if desired.

The process and the nature of the novel adsorbents resulting therefrom are more readily understood by reference to the following examples which are illustrative only and are in no way intended to be limitative of the present invention.

In the examples, wollastonite from Willsboro, Essex county, New York, was employed as the starting material. Analysis of the wollastonite is as follows:

| | Wt. percent |
|---|---|
| CaO | 46.90 |
| $SiO_2$ | 50.90 |
| $Al_2O_3$ | 0.25 |
| $Fe_2O_3$ | 0.55 |
| $H_2O$ | 0.90 |
| $TiO_2$ | 0.05 |
| MgO | 0.10 |
| MnO | 0.10 |

EXAMPLE 1

Sample (A)

10.0 grams of wollastonite were leached with 31.5 ml. of 6 normal hydrochloric acid for 1 hour at a temperature of 100° C. The product silica pseudomorph was washed with wtaer, dried in air and activated by heating in air. The product contained no occluded $CaCl_2$. Adsorption isotherms for oxygen and water were found to be of the Langmuir type.

Sample (B)

10.0 grams of wollastonite were leached with 63.0 ml. of 3 normal hydrochloric acid for 16 hours at 100° C. The product silica pseudomorph was washed with water, dried in air, and activated by heating in air. The product contained no significant amount of $CaCl_2$ and exhibited adsorption isotherms for oxygen and water of the Brunauer Type II.

Sample (C)

10.0 grams of wollastonite were leached with 63.0 ml. of 3 normal hydrochloric acid for 21 hours at 25° C. The product was washed with water to a neutral pH and air dried. Analysis showed the product, a Type WC pseudomorph, to be a composite of silica and calcium chloride having a $CaCl_2$ content of about 18.1 weight percent on an anhydrous basis.

The adsorption characteristics of the activated products of Samples (A), (B), and (C) were determined for oxygen, water, normal butane, carbon dioxide and ethane, and were compared with the characteristics of a commercial silica gel and a synthetic crystalline zeolitic molecular sieve (Linde 5A Zeolite, a calcium-exchanged Type A zeolite as disclosed in U.S. Pat. 2,882,243). The results, including the various activation conditions, are set forth in Table II below.

TABLE II.—ADSORPTION BY PSEUDOMORPHIC WOLLASTONITE ADSORBENT TYPE [1]

| Adsorbate | Temp., °C. | Press., mm. of Hg | Activ. temp., °C. | Sample (A) Type I | Sample (B) Type II | Sample (C) Type WC | Commercial silica gel | Linde 5A zeolite |
|---|---|---|---|---|---|---|---|---|
| $O_2$ | −183 | 100 / 700 | 200 | 16.0 / 27.0 | 14.4 / 37.0 | 6.5 / 14.8 | 21.0 / 37.0 | |
| | −183 | 100 / 700 | 350 (20 hrs.) | 15.2 / 23.6 | 14.3 / 35.9 | 3.5 / 10.6 | 19.5 / 36.0 | 26.6 / 27.8 |
| | −183 | 100 / 700 | 350 (124 hrs.) | 12.2 / 20.2 | 11.5 / 32.0 | | 19.5 / 33.4 | 26.2 / 27.0 |
| | −183 | 100 / 700 | 430 | 11.6 / 19.1 | 10.5 / 30.2 | | | |
| | −183 | 100 / 700 | 200 (after 350 activ. and $H_2O$ adsorption) | 13.2 / 20.9 | 12.7 / 31.7 | 2.0 | | 27.0 / 27.7 |
| | | | 350 activ. and $H_2O$ Adsorption | | | | | |
| $H_2O$ | 27 | 4.0 / 20.0 | 200 | 10.0 / 22.4 | 8.5 / 25.0 | 14.8 / 34.4 | | 25.0 / 27.8 |
| | 27 | 4.0 / 20.0 | 350 (20 hrs.) | 9.4 / 21.2 | 8.4 / 28.4 | 13.0 / 30.2 | | 24.4 / 27.4 |
| | 27 | 4.0 / 20.0 | 350 (108 hrs.) | 7.4 / 20.5 | 7.0 / 30.8 | | 6.6 / 29.8 | 24.0 / 29.0 |
| | 27 | 4.0 / 20.0 | 430 | 6.3 / 20.0 | 5.3 / 28.9 | | | |
| n-$C_3H_{10}$ | 27 | 100 / 700 | 200 | 3.5 / 7.8 | 2.2 / 9.1 | 0.4 / 1.6 | | 13.4 / 13.9 |
| | 50 | 620 | 200 | 4.9 | 4.3 | 0.4 | | 13.1 |
| | 95 | 620 | 200 | 2.6 | 1.8 | 0.2 | | 12.1 |
| $CO_2$ | 27 | 100 / 700 | 350 | 0.6 / 3.1 | 0.8 / 2.7 | | | |
| $C_2H_6$ | 0 | 730 | 350 | 1.5 | 1.5 | | 2.5 | 9.0 |

[1] Expressed as grams of adsorbate per gram of activated adsorbent ×100.

To demonstrate that wollastonite does not produce the unique composite adsobents of this invention if subjected to a more severe acid treatment, the following procedure was carried out:

In a 3-necked round-bottom reaction flask equipped with stirrer and thermometer were placed 189 cc. of 15% aqueous HCl (∼4.1 N). To this were slowly added 50 grams of finely-divided woolastonite over a period of 15 minutes. The slurry was continuously stirred during addition of the $CaSiO_3$ and the flask was cooled by a water bath. During this addition the temperature rose from 28° C. to 38° C. This mixture was allowed to stand without agitation for 30 minutes after the end of the $CaSiO_3$ addition. The liquid was decanted; 200 cc. of water were added to the sediment and stirred. The solids were filtered out and washed with water to a neutral pH. The solid product was dried at 300° C.

The solid product did not contain any occluded calcium chloride and the oxygen adsorption at −183° C. (grams $O_2$ per gram product at 200° C. x 100) was found to be 11.0 at 100 mm. Hg $O_2$ pressure. The $H_2O$ adsorption at 30° C. (grams $H_2O$ per gram product activated at 200° C.) was found to be 7.0 at 4 mm. Hg $H_2O$ pressure. These values are about twice as great and half as great respectively as typical values for the type WC pseudomorph of the present invention.

What is claimed is:
1. Process for preparing an amorphous adsorbent material which comprises contacting with an aqueous hydrochloric acid solution having a concentration of from about 2.5 to about 3 normal wollastonite, said acid being present in an amount such that there are at least 0.9 equivalents of acid-derived hydrogen ion per equivalent of metal in the wollastonite for a period of time of from about 0.1 to about 24 hours and at a temperature of from about 15° C. to about 60° C. until substantially all of the calcium of said wollastonite has reacted with the acid leaving a solid silica form pseudomorphic after the starting wollastonite and having associated therewith calcium chloride.

2. A silica-calcium chloride composite containing from about 10 to about 40 weight percent calcium chloride on an anhydrous basis, being amorphous to X-rays and being pseudomorphic after wollastonite, said composite when anhydrous being capable of adsorbing at least about 15 weight percent water at 25° C. and 25 percent relative humidity and at least about 30 weight percent water at 25° C. and 60 percent relative humidity.

References Cited
UNITED STATES PATENTS

| | | | |
|---|---|---|---|
| 1,835,055 | 12/1931 | Jenkins et al. | 252—450 |
| 1,884,709 | 10/1932 | Jenkins et al. | 252—450 |
| 2,163,526 | 6/1939 | Caldwell | 252—457 |
| 2,686,731 | 8/1954 | Wainer | 106—306 |
| 3,033,799 | 5/1962 | Thomsen | 252—450 |
| 3,110,564 | 12/1963 | Rodis et al. | 252—450X |

DANIEL E. WYMAN, Primary Examiner

C. F. DEES, Assistant Examiner

U.S. Cl. X.R.

252—457